United States Patent [19]
Kirkham

[11] 3,777,128
[45] Dec. 4, 1973

[54] INPUT DATA SAMPLING SCHEME FOR COMPUTER CONTROLLED MACHINE TOOLS

[75] Inventor: Edward E. Kirkham, Brookfield, Wis.

[73] Assignee: Kearney & Trecker Corporation, West Allis, Wis.

[22] Filed: Mar. 31, 1972

[21] Appl. No.: 239,966

Related U.S. Application Data

[63] Continuation of Ser. No. 35,480, May 7, 1970, abandoned.

[52] U.S. Cl............ 235/151.11, 318/562, 318/636, 235/150.1
[51] Int. Cl....................... G05b 19/18, G06f 15/46
[58] Field of Search.................... 235/150.1, 151.11, 235/92 MP; 318/561, 562, 603, 636; 328/151

[56] References Cited
UNITED STATES PATENTS

| | | | |
|---|---|---|---|
| 3,611,101 | 10/1971 | Kiffmeyer et al. | 318/603 X |
| 3,576,979 | 5/1971 | McCall et al. | 235/151.11 |
| 3,654,446 | 4/1972 | Gordon et al. | 235/151.11 X |
| 3,430,035 | 2/1969 | Read | 235/151.11 |
| 3,465,332 | 9/1969 | Neal | 318/636 X |
| 3,625,812 | 12/1971 | Gudaz et al. | 235/150.1 UX |
| 3,665,168 | 5/1972 | Canfield | 235/150.1 X |
| 3,578,957 | 5/1971 | Gatlin | 235/150.1 |

Primary Examiner—Eugene G. Botz
Assistant Examiner—Jerry Smith
Attorney—Cyril M. Hajewski et al.

[57] ABSTRACT

An apparatus and method for sampling input data to a computer which is controlling the operations of a machine tool. A general purpose digital computer is used to provide servo control signals to the various machine tool slides. The output digital signals of the computer are converted to analog signals by digital to analog converters and fed in the machine tool servo valves which, in turn, control servomotors which, in turn, drive the machine tool slides. Data is sent back to the computer from feedback transducers which are operably connected to the machine tool slides. Means are provided between the feedback transducers and the computers for passing a sampling of the feedback data at periodic intervals. The computer is programmed to request data from the particular feedback device at these intervals. The computer compares this sample of feedback data with the next previous sample of feedback data. This comparison tells the computer the direction, distance, and at what velocity the machine tool slide has moved.

16 Claims, 4 Drawing Figures

INVENTOR.
EDWARD E. KIRKHAM

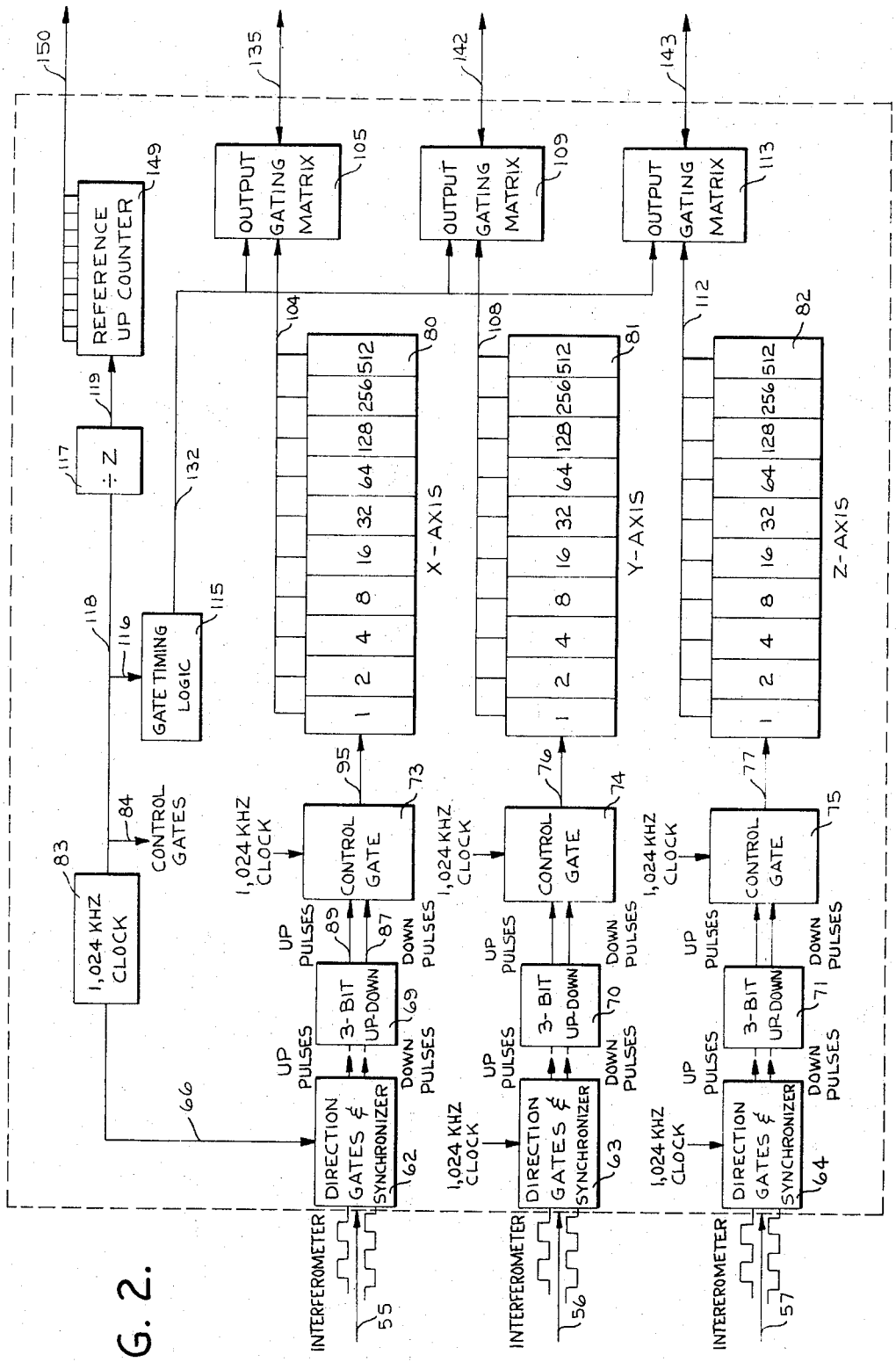

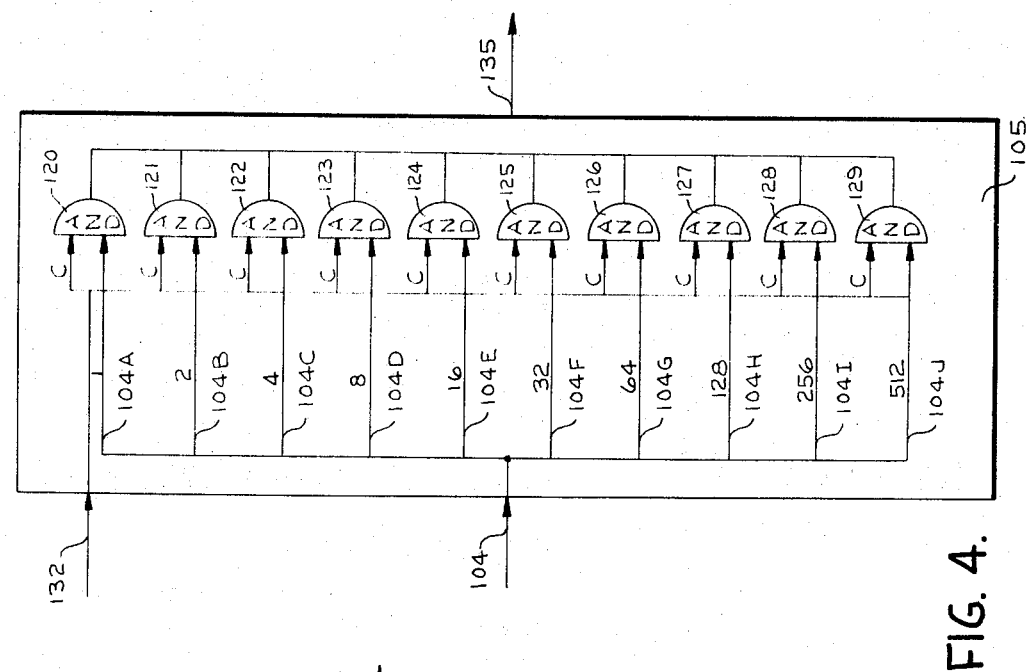
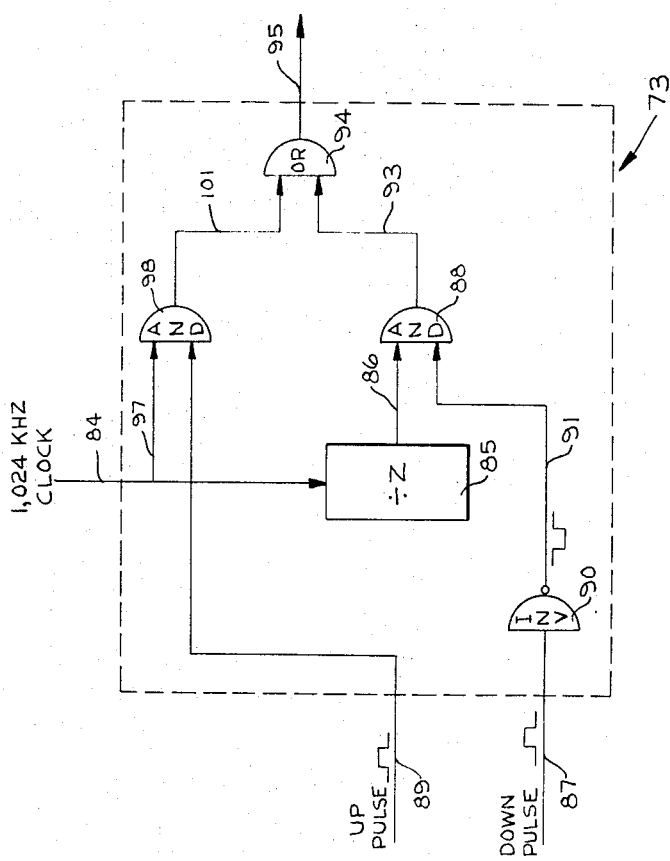
FIG. 4.
FIG. 3.

INPUT DATA SAMPLING SCHEME FOR COMPUTER CONTROLLED MACHINE TOOLS

This application is a continuation of my co-pending application, Ser. No. 035,480, filed May 7, 1970 and now abandoned.

BACKGROUND OF THE INVENTION

This invention relates to computer controlled machine tools and more particularly to an apparatus and method for sampling the data sent back to the computer from the various feedback transducers.

Before this invention, the computer would send command signals to the machine tool slide servomechanisms effecting the movement of the slide members. Feedback transducers operably connected to the slide members would continuously send back feedback data to the computer. This feedback data was compared to the command signal until the command signal and feedback signal were in agreement at which time the operation of the servomechanism would stop and the positioning of the slide would have been effected by the computer. When a computer operates in this fashion it is called a real-time operation. The computer is paralleling data processing with a physical process in such a fashion that the results of the data processing are immediately useful to the physical operation. When the computer is being used in a real-time operation it cannot be used to process other needed background programs such as computation and compiling.

The present invention overcomes the problem of having the computer continually being tied up in its input/output mode by taking the computer off its input/output mode of operation and permitting it to run background programs during the time periods between feedback data samples. This is accomplished by the use of interface apparatus which is used to collect feedback data and pass this larger quantity of data at uniformly spaced apart periodic intervals to the computer.

SUMMARY OF THE INVENTION

It is therefore the object of the present invention to provide a data sampling apparatus and method which controls the sending of feedback data from the feedback transducers to the input channels of the computer. The arrangement is such that each individual feedback signal pulse from the data sampling apparatus corresponds to a plurality of individual data input signal pulses from the computer and represents a larger increment of movement corresponding to a plurality of smaller increments of movement conforming in number to the data input signal pulses initiating that particular total movement and producing that feedback signal pulse.

According to the present invention, there is provided a machine tool comprising a pair of members carried for relative movement, a servomotor connected to effect relative movement between said members, a computer control system operative to provide output command signals connected to actuate the servomotor for effecting predetermined relative movement between the members, a linear feedback transducer operative to supply feedback signals to a data sampling means which is connected between the feedback transducer and the input channel of the computer, and means to effect a transfer of feedback data to the computer from the data sampling means initiated at regular time intervals. The feedback data is then processed by the computer for its use in controlling the operation of the machine tool.

BRIEF DESCRIPTION OF THE DRAWINGS

FIG. 2 is a block schematic diagram of the data sampling unit of FIG. 1;

FIG. 3 presents the detailed logic circuit of the X-axis control gate shown in FIG. 2; and, FIG. 4 presents the detailed logic circuit of the X-axis output gating matrix shown in FIG. 2.

DESCRIPTION OF THE PREFERRED EMBODIMENTS

Figure 1:
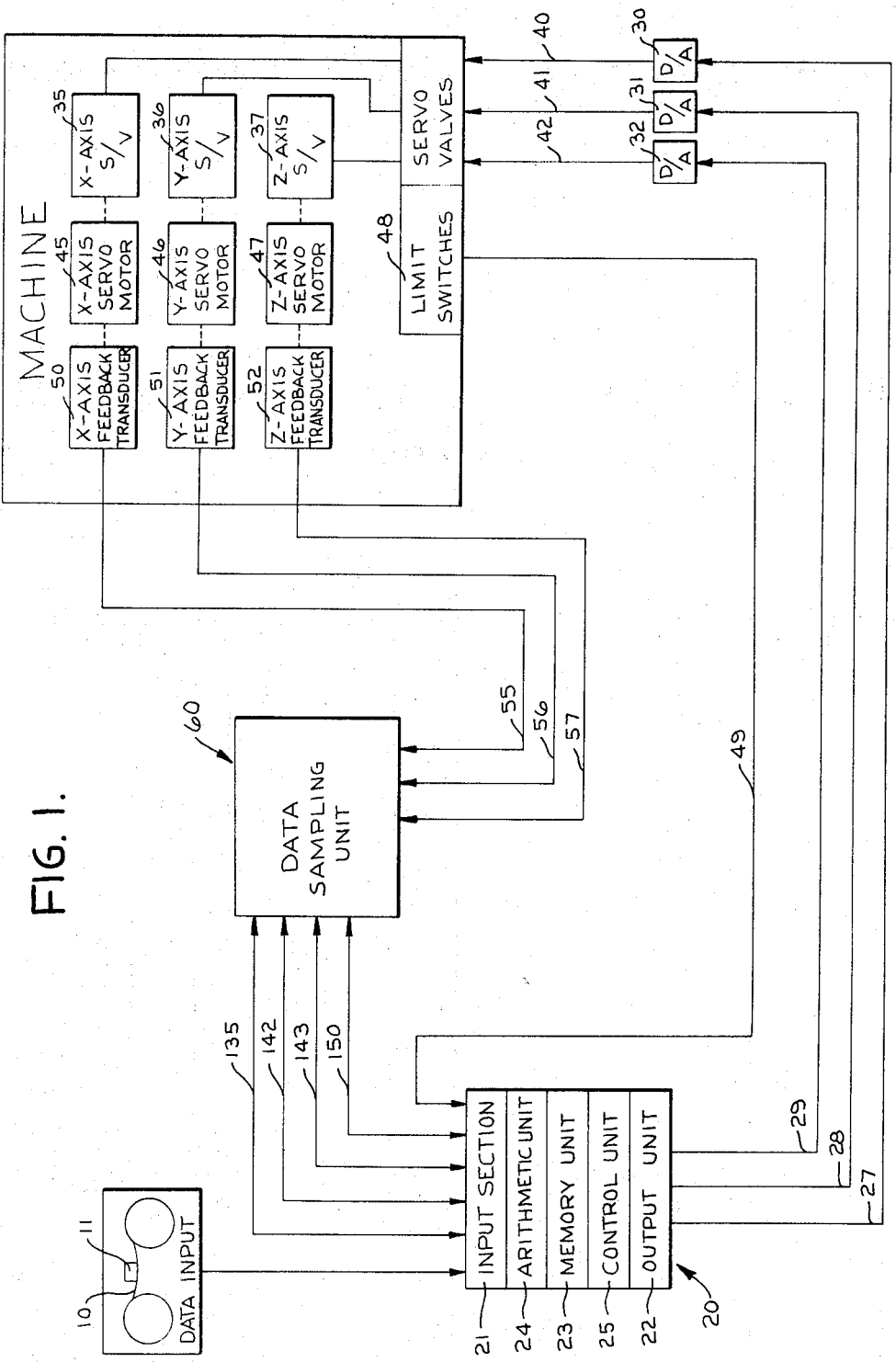
FIG. 1 is a general block schematic showing the basic components of the computer controlled machine tool system.

Referring now to FIG. 1 illustrating a block schematic diagram of a computer controlled machine tool system. The machine tool system utilizes data that is recorded in information blocks along a punched tape 10. Each of these blocks of data consists of digital words representing instructions to the machine tool. These digital words represent the direction, distance, and rate of movement of the machine tool along the X, Y and Z axes. A tape reader 11 reads the recorded data on the punched tape 10, in a well-known manner, to provide the operating control signals to a control computer 20.

The control computer 20 can be any suitable form of general digital computer which includes an input section 21, output unit 22, memory unit 23, arithmetic unit 24, and a control unit 25. The control unit 25 coordinates the operation of the rest of the computer. Data stored in the memory unit 23 is supplied under direction of the control unit 25 to the arithmetic unit 24 for processing and then returned to the memory unit 23 to be stored at a location therein. When it is time for some information to be read to the memory unit 23, the control unit 25 activates the input section 21 appropriately and sets up a path from the input section 21 to the proper place in the memory unit 23. Similarly, when an output of information is necessary, the control unit 25 must activate the output unit 22 and arrange that the proper information be sent from the memory unit or arithmetic unit 24 to the output unit 22. Finally, when an arithmetic operation is to be performed, the control unit 25 must arrange for the appropriate operands to be transferred from the memory unit 23 to the arithmetic unit 24, for the proper operation to be carried out, and the result to be stored back in the memory unit 23 if that is required.

Control computer 20 is the main component of a "soft-wire controller." Control computer 20 can provide servo control for the various machine tool slides by closing the servo loop through the computer using feedback transducers and digital to analog converters to drive hydraulic valves which, in turn, operate the various axes servomotors.

The program data, that is sent from the tape reader 11 to the control computer 20, is read into the active or buffer portion of the memory unit 23 of the computer 20 and interpolated into discreet digital pulse trains. As known in the art, the individual input command signal pulses initiated by the tape reader or data source are retained in the buffer portion of the memory 23 until that particular servo movement is completed. These discreet digital pulse trains are sent from the output device 22 along conductors 27, 28 and 29. These signals are converted to analog signals by the digital to analog (D/A) converters 30, 31 and 32 respectively. The analog signals are fed to the machine tool servo valves 35, 36 and 37 by conductors 40, 41 and 42 respectively. Servo valve 35 in turn controls a servomotor 45 which drives the X-axis machine tool slide. Servo valve 36 in turn controls a servomotor 46 which drives the Y-axis machine tool slide. Servo valve 37 in turn controls a servomotor 47 which drives the Z-axis machine tool slide. Limit switches 48 are mounted on the machine tool and inform the control computer 20, via conductor 49, of the machine status.

Attached to the machine tool slides are feedback transducers 50, 51 and 52 which generate a signal which, when compared to the input signal, verifies that the desired command has been completed. Transducers 50, 51 and 52 are of the type which supply a digital signal output. One such transducer is the laser interferometer. One such commercially available laser interferometer may be the Perkin-Elmer Model INF-1. The outputs of the laser interferometer include quadrature square wave signals suitable for driving standard counters. The quadrature square wave signals from the laser feedback transducers 50, 51 and 52 are connected via conductors 55, 56 and 57 respectively, to a data sampling unit 60.

As shown in FIG. 2, these quadrature square waves on conductors 55, 56 and 57 are connected to a set of direction sensing gates 62, 63 and 64 of the three servo loops. The direction sensing gates 62, 63 and 64 decode these quadrature signals and determine in which direction the machine axis slides are moving and supply a series of up pulses for one direction of movement and a series of down pulses for the opposite direction of travel. Such direction sensing gates are well-known in the art and, therefore, a more detailed description of the internal operation of direction sensing gates 62, 63 and 64 is not undertaken herein.

Each direction sensing gate contains a synchronizer unit which acts to save the up and down pulses until a clock pulse, via conductor 66, occurs. The up and down pulses emitted from the direction gates are acted on by alternate clock pulses in a manner to be subsequently described. With the particular Perkin-Elmer interferometer mentioned above, a up or down pulse, depending on the direction of slide movement is emitted from the direction sensing gate every time the particular slide moves 1.56 microinches. Each of the direction sensing gates 62, 63 and 64 is connected to a 3-bit up-down counter 69, 70, 71 respectively. The 3-bit counter diminishes the number of pulses coming from the direction sensing gates by a factor of 8. The lower frequency pulse trains are delivered to a control gate 73, 74, 75 respectively; each of the lower frequency pulses representing 12.48 microinches of slide movement. Each of the control gates 73, 74 and 75 acts to add or block pulses into the 10-bit up counters 80, 81 and 82 respectively.

The logic circuit of the X-axis control gate 73 is shown in FIG. 3. The Y-axis control gate 74 and the Z-axis control gate 75 are comprised of circuits identical to the X-axis control gate. A clock 83, as shown in FIG. 2, supplies a 1,024 kilohertz pulse train to each of the control gates 73, 74 and 75. The 1,024 kilohertz pulse train is also supplied to a gate timing logic circuit 115, via conductor 116, and to a divide by two logic element 117, via conductor 118. Element 117 is a 1-bit binary counter whose output on conductor 119 is a pulse train which is one-half the frequency of the 1,024 kilohertz clock pulse train.

As shown in FIG. 3, the 1,024 kilohertz clock signal is supplied via conductor 84 to a divide by two logic element 85. Element 85 is a 1-bit binary counter whose output on conductor 86 is a pulse train which is one-half the frequency of the 1,024 kilohertz clock pulse train. This 512 kilohertz pulse train is applied via conductor 86 to AND gate 88. The down pulse signals coming from the 3-bit up-down counter 69 is supplied via conductor 87 to inverter gate 90. Any down pulses will have been timed by the synchronizer in the direction sensing gate 62 to coincide with the 512 kilohertz pulses on conductor 86. The inverted down pulse signal from inverter gate 90 is supplied to AND gate 88 via conductor 91. A logic 1 state on conductor 91 will allow AND gate 88 to pass the 512 kilohertz pulse train from the divide by two logic element 85. The output conductor 93 of AND gate 88 is connected to OR gate 94. The 512 kilohertz pulse train will be passed by the OR gate 94 and is supplied via connector 95 to the X-axis 10-bit up-down counter 80. When the down pulse is passed by inverter gate 90, the state of the output signal of this gate goes to the logic state of 0. A logic 0 signal at AND gate 88 will act to block the passage of one 512 kilohertz clock pulse. At the end of the down pulse, the logic state of the output of inverter gate 90 will change back to a logic 1 state again allowing AND gate 88 to pass all of the 512 kilohertz signal pulses. The 1,024 kilohertz clock pulse train is also supplied via conductor 97 to AND gate 98. The up pulse signal coming from the 3-bit up-down counter 69 is supplied via conductor 89 to AND gate 98. Any up pulses will have been timed by the synchronizer in the direction sensing gate 62 to coincide with alternate pulses of the 1,024 kilohertz pulse train. An alternate pulse being the pulse that precedes the output pulse of the divide by two logic element 85. An up pulse on conductor 89 will enable AND gate 98 to pass one clock pulse. This clock pulse is supplied to OR gate 94 via conductor 101. This pulse will be passed by OR gate 94 and added to the 512 kilohertz pulse train coming from AND gate 88 via conductor 93 which is also being passed by OR gate 94. Similarly, the Y-axis control gate 74 operates in a like manner and is connected via conductor 76 to the Y-axis 10-bit up counter 81. Similarly, the Z-axis control gate 75 operates in a like manner and is connected via conductor 77 to the Z-axis 10-bit up counter 82.

The X-axis 10-bit up counter 80 counts up by one when a pulse is supplied via conductor 95. The net count of the counter 80 is continuously delivered in binary digit form via conductor 104 to a sampling matrix 105. Though conductor 104 is shown as a single conductor, it will, of course, be understood to include one channel for each bit sensed. Similarly, the net count of the Y-axis 10-bit up counter 81 is delivered via conductor 108 to an output gating matrix 109. Similarly, the net count of the Z-axis 10-bit up counter 82 is delivered via conductor 112 to an output gating matrix 113. In this embodiment of the invention, as shown in FIG. 2, the sampling matrix is shown located within the data sampling unit 60. It is to be understood that each of these sampling matrices could be an interface card located inside the computer. The interface card plugs into a slot in the input section of the computer. Each slot is assigned a fixed address and the computer can then communicate with them.

As shown in FIG. 4, the X-axis output gating matrix 105 is comprised of 10 AND gates numbered 120 to 129. Each AND gate is connected to the output of one of the binary bits of the 10-bit up counter 80. For example, if counter 80 had the net count of 400, there would be a logic 1 signal standing on conductors 104I, 104H and 104E and a logic 0 signal on conductors 104A, 104B, 104C, 104D, 104F, 104G and 104J. Another example, if counter 80 had the net count of 15, there would be a logic 1 signal standing on conductors 104A, 104B, 104C and 104D and a logic 0 signal on conductors 104E, 104F, 104G, 104H, 104I and 104J.

A periodic sample clock pulse C is supplied via conductor 132 to each of the AND gates 120 to 129. This periodic sample clock pulse C effects the passage of the particular net count in the X-axis up counter 80 through the AND gates 120 to 129, and via conductor 135 to the input section 21 of the control computer 20. The periodic sample clock pulse C is also supplied to the Y-axis sampling matrix 109 and the Z-axis sampling matrix 113. Similarly, the Y-axis sampling matrix 109 will periodically pass the net count of the Y-axis up counter 81 via conductor 142 to the input section 21 of the control computer 20. Similarly, the Z-axis sampling matrix 113 will periodically pass the net count of the Z-axis up counter 82 via conductor 143 to the input section 21 of the control computer 20. The control computer 20 will compare the outputs of the sampling matrices 105, 109 and 113 with the output of a reference 10-bit up counter 149.

As shown in FIG. 2, the 512 kilohertz pulse train from the divide by two logic element 117 is supplied via conductor 119 to the reference counter 149. The output of the reference counter 149 is supplied via conductor 150 to the input section 21 of the control computer 20. Though conductor 150 is shown as a single conductor, it will, of course, be understood to include one channel for each of the ten bits of the reference up counter 149. When there are no up or down pulses being fed into the various control gates 73, 74 and 75, their respective up counters 80, 81 and 82 will count in step with the reference counter 149. For example, let us assume we start operating and both the X-axis up counter 80 and the reference up counter 149 register 0 counts. The 512 kilohertz pulse trains on conductors 95 and 119 will count up the X-axis and reference counters 80 and 149 respectively, in unison. Every 1.953 microseconds another count will be added to each of the up counters 80 and 149. After a period of 976 microseconds there would be a count of 500 in both the X-axis up counter 80 and the reference up counter 149. Now, let us assume that during the next 976 microseconds time period there are 8 down pulses emitted from the X-axis sensing gate 62 indicating that the X-axis slide moved 12.48 microinches in a particular direction. Eight down pulses into the 3-bit up-down counter 69 will result in one pulse out on conductor 87, representing the 12.48 microinches of slide movement. As represented earlier, a pulse on conductor 87 will effect the blocking of one of the 512 kilohertz pulses being supplied on conductor 86 resulting in one less pulse being supplied on conductor 93, and consequently, one less pulse being supplied on conductor 95, to the X-axis up counter 80. Now the count in reference counter 149 will be 1000 while the count in the X-axis up counter will be 999, indicating that the X-axis slide moved 12.48 microinches in a particular direction.

Now let us assume that another period of 976 microseconds passes. The 512 kilohertz pulse train supplied on conductor 119 to the reference up counter 149 will have advanced that counter another 500 counts, so it will now register 476 counts. As we added the 500 new counts to reference up counter 149, the first 23 counts advanced the counter to its top count value of 1,023. The next pulse resets the reference counter to zero and the remaining 476 pulses were counted in bringing the reference up counter 149 to its present 476 count position. Now let us assume that during this 976 microsecond period there are 24 up pulses emitted from the X-axis sensing gate 62 indicating that the X-axis slide moved 37.44 microinches in a direction opposite to the particular direction assumed above. Twenty-four up pulses into the 3-bit up-down counter 69 will result in three pulses out on conductor 89, representing 37.44 microinches of slide movement. As represented earlier, three pulses on conductor 89 will effect the addition of three pulses to the 512 kilohertz pulse train on conductor 93 resulting in three additional pulses being supplied on conductor 95 to the X-axis up counter 80. Now the count in the reference counter will be 476 while the count in X-axis up counter will have advanced from 999 to 478, indicating that the X-axis slide has moved 37.44 microinches in an opposite direction since the last time we looked at the counts in the X-axis up counter 80 and the reference up counter 149.

The control computer 20 will periodically check the number of counts in a particular axis up counter and compares this count with the count that is in the reference up counter 149. The difference between the count in the axis up counter and the count in the reference up counter 149 tells the control computer 20 how far that particular axis slide moved and in what direction.

The periodic sample pulse C is supplied by the gate timing logic circuit 115. As mentioned before, the 1,024 kilohertz pulse train from clock 83 is supplied via conductor 116 to the gate timing logic circuit 115. The gate timing logic circuit 115 changes the 1,024 kilohertz pulse train into a plurality of lower frequency pulse signals. The circuiting of such a gate timing logic circuit is well-known in the art and thus need not be described here.

The desired feedback data sampling rate, that is the frequency of pulse C, is determined in part by taking into consideration the maximum frequency of the pulse train originating from the laser interferometer feedback transducers 50, 51 and 52. With the particular Perkin-Elmer interferometer mentioned above, a pulse is emitted from the direction sensing gates 62, 63 and 64 every time the particular axis slide moves 1.56 microinches. Let us assume that it is desired to provide for a maximum slide speed of 4.68 inches per second. Therefore, the maximum pulse frequency emitted by the direction sensing gates 62, 63 and 64 would be 3 megahertz. The 3-bit counters 69, 70 and 71 will diminish this pulse frequency by a factor of 8 to 375 kilohertz. The 10-bit up countrs can handle 1,023 pulses before reverting back to their zero count state. If we did not sample often enough when we got to the top slide speed, and the 10-bit counter recorded more than 512 pulses, we would not know whether that counter was counted "up" or counted "down" in its relationship with the reference counter 149. In other words, we would not know whether 512 or more pulses were being added to the pulse train leaving the control gate, or if 512 or more pulses of the pulse train were being blocked by the control gate. Therefore, at top slide speed we would need to samp'e the data within the X-axis up register 80, Y-axis up register 81 and Z-axis up register 82 every millisecond or less. Of course, when the machine tool slides are not moving at top speed, their feedback data can be sampled at a less frequent rate.

Control computer 20, through its program instructions, controls the transfer of the data from the X-axis up register 80, Y-axis up register 81, Z-axis up register 82, and the reference up counter 149, to its input section 21. The control computer 20 compares the difference between one feedback data sample and the next previous feedback data sample producing a result represented by a digital count indicative of the error between the commanded slide position and its actual position at the time of the feedback data sample. If the slide movement called for by the tape 10 is a distance long enough to span a number of data samples, the sampled data will also be indicative of the slide velocity.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, I hereby claim as my invention:

1. In a computer controlled machine tool system;
   a pair of mechanically interconnected members carried for movement relative to one another;
   a position transducer operatively coupled to the machine tool members to provide a feedback signal indicating the movement of said members relative to each other;
   a power drive means connected to effect relative movement between said members;
   a source of data for initiating input signal pulses;
   a computer programmed to produce command signals initiated by said data source for said power drive means; and
   sampling means connected between said position transducer and said computer operable to so pass feedback signals periodically to said computer that each feedback signal equals a plurality of command signal pulses, whereby the computer compares the sampled feedback data with the next previous sampled feedback data for producing a signal proportional to the relative movement of said members from a previous position.

2. A computer controlled machine tool system according to claim 1, wherein said position transducer is operative to indicate changes in position by providing a direct source of digital signal pulses.

3. A machine tool according to claim 2 wherein said transducer is a laser interferometer.

4. In a machine tool having a servo driven movable slide member and provided with a data source and computer control for producing command signals from said data source to the servo drive for effecting the desired movement of the slide member;
   means responsive to the movement of said slide member for producing feedback signals representative of increments of movement of said slide member;
   means for generating a plurality of periodic signals; and
   data sampling means connected to receive said feedback signals and being responsive to said periodic signals applied thereto for passing the spaced apart feedback signals to said computer for computing the difference between said feedback signal sample and the next previous feedback sample and producing a digital count representing the error between the commanded slide position and its actual position at the time of the feedback data sample.

5. A method of sampling the input data supplied to a computer which is controlling the operation of a plurality of machine tool slide members, comprising the steps of:
   generating feedback pulses from a position transducer which is coupled to the machine tool members and is indicative of increments of relative movement of said members; and
   sampling the feedback pulses periodically at intervals uniformly spaced apart in time and supplying said sampled feedback pulses to said computer, and with the sampled feedback pulses having a value proportional to the direction and distance of relative movement between said machine tool members.

6. A method of sampling the input data signal pulses from a source supplied to a computer operatively connected to control the operation of a plurality of machine tool slide members for moving said members a total number of increments of movement corresponding in number to the total number of input signal pulses comprising the steps of:
   generating feedback signal pulses from a position transducer which is coupled to the machine tool members and is indicative of increments of relative movement between said members; and
   sampling the feedback signal pulses at uniformly spaced apart intervals of movement and supplying the sampled feedback pulse to said computer in a manner that each sampled feedback pulse is so spaced apart relative to the other feedback pulses as to have a value proportional to the total accumulated incremental distance of relative movement between said machine tool members.

7. In a computer controlled machine tool;
   a pair of mechanically interconnected members carried for movement relative to one another;
   a position transducer operatively coupled between the machine tool members to provide a feedback signal indicating the movement of one of said members relative to the other;
   power drive means connected to effect relative movement between said members;
   means for initiating data signals;
   a computer programmed to produce command signals for controlling said power drive means, said computer being operable to transmit signals initiated by said means to actuate said power drive means to effect movement between said members; and sampling means connected in the return path between said position transducer and said computer operable to pass feedback signals from said transducer periodically to said computer, said sampling means being operative to space said feedback signals uniformly farther apart in time in a manner that each feedback signal corresponds to a plurality of individual data signals from said computer, whereby the computer compares the sampled feedback data with the next previous sampled feedback data for producing a signal proportional to the relative movement of said members from a previous position.

8. In a computer controlled machine tool system;
a machine and a member carried thereby for relative rectilinear movement;
power drive means to move said member;
a source for initiating input data signals;
computer means programmed to supply data signals initiated by said data source to operate said power drive means and being simultaneously programmed to receive return feedback signals at uniformly spaced apart time periods in a manner that each feedback signal equals plural input signals, said computer means being operative to transmit data signals initiated by said source in accordance with the program established by said computer means;
a transducer actuated by movement of said machine member and operative to produce feedback signals timed to coincide with the input signals from said computer means; and
sampling means operatively interconnected between said transducer and said computer, said sampling means being adapted to accumulate signals in groups representing corresponding successive increments of movement of said member and pass such signals to said computer at spaced apart time intervals.

9. In a machine having a member carried for relative rectilinear movement and a power drive connected to selectively move said member;
signal means for initiating data input signals;
computer means prorammed to dynamically transmit data signals initiated by said signal means to actuate power drive to move said member;
a transducer actuated by movement of said member operative to provide feedback signals indicating positional movement of said member; and
a data sampler operative to accumulate a plurality of feedback signals from said transducer and connected to transmit resultantly fewer feedback signals to said controller at uniformly spaced time intervals.

10. In a machine tool having a frame and a member supported by said frame for movement;
a source of power connected to actuate said movable member in its movement;
a source of information furnishing data which specifies the desired movement of said movable member;
monitoring means connected to produce data indicating the actual movement of said member as it is being actuated by said source of power;
comparing means connected to compare the data from said monitoring means against the data furnished by said source of information for producing the desired control to meet the requirements specified by said source of information; and
sampling means connected to periodically pass the information from said monitoring means to said comparing means so that the information is transmitted to said comparing means at spaced intervals of time.

11. A machine tool according to claim 10 wherein said monitoring means is a transducer connected to produce feedback information indicating the actual movement of said member.

12. A machine tool according to claim 10 wherein said comparing means is a digital computer and said sampling means passes the information from said monitoring means to said computer at spaced intervals of time in order to free said computer for other functions during such time intervals.

13. A machine tool according to claim 12 wherein said monitoring means is a transducer connected to produce feedback information indicating the actual movement of said member and said sampling means passes such information to said computer for producing the desired control of said movable member.

14. A machine tool according to claim 10 wherein said sampling means comprises:
a register connected to receive the information from said monitoring means and register the movement of said movable member as it occurs;
an AND gate for each bit of said register, each of said AND gates having an input connected to its associated bit in said register;
a pulse generator for producing electrical pulses at a specific frequency connected to the input side of each of said AND gates; and
means connecting the outputs of each of said AND gates to said comparing means so that each time a pulse is produced by said pulse means, said AND gates will pass the information from said register to said comparing means to produce the desired regulation of said movable member.

15. In a control for regulating the function of a machine tool;
a source of information supplying data which defines the functions to be performed by the machine tool;
a computer connected to receive the data from said source of information;
monitoring means for each of said functions for producing data to indicate the status of each function as it is being performed;
comparing means in said computer for comparing the information from said monitoring means with the stored data from said source of information for producing the desired control to meet the requirements specified by said source of information; and
sampling means connected to periodically pass the information from the monitoring means of a particular function to said comparing means at spaced intervals of time in order to free said computer for regulating other functions during such time intervals.

16. A machine tool accordng to claim 15 wherein said sampling means comprises:
an AND gate;

a connection from said monitoring means to an input of said AND gate;

a pulse generator for producing electrical pulses at a specific frequency connected to the input side of said AND gate; and means connecting the output of said AND gate to said comparing means so that each time a pulse is produced by said pulse means, said AND gate will pass the information from said monitoring means to said comparing means to produce the desired regulation of the function.

* * * * *